March 4, 1924.　　　　T. G. EDWARDS　　　　1,485,494

TRAP

Filed Jan. 4, 1922　　　2 Sheets-Sheet 1

T. G. Edwards,
Inventor.

By C. A. Snow & Co.
Attorneys.

March 4, 1924.
T. G. EDWARDS
TRAP
Filed Jan. 4, 1922
1,485,494
2 Sheets-Sheet 2
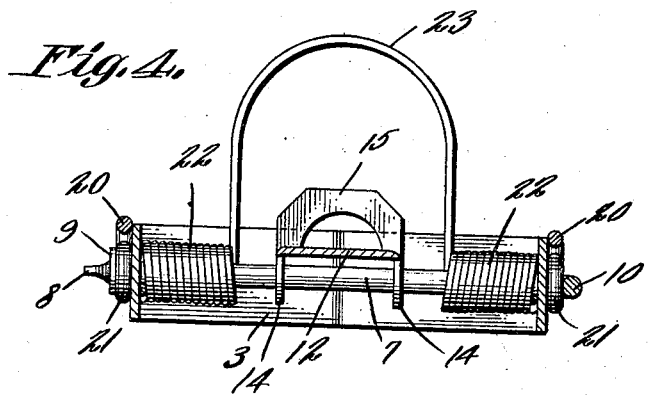
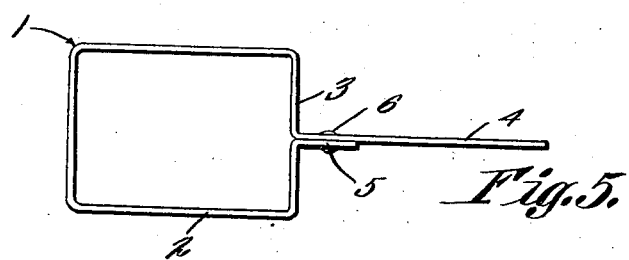
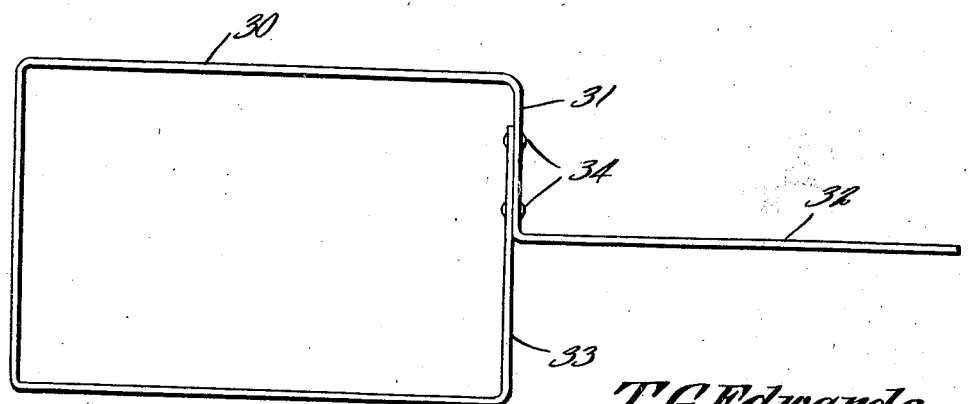
T. G. Edwards,
Inventor.
By C. A. Snow & Co.
Attorneys.

Patented Mar. 4, 1924.

1,485,494

UNITED STATES PATENT OFFICE.

THOMAS G. EDWARDS, OF ARLINGTON, KENTUCKY; BERTHA EDWARDS ADMINSTRATRIX OF SAID THOMAS G. EDWARDS, DECEASED.

TRAP.

Application filed January 4, 1922. Serial No. 526,905.

*To all whom it may concern:*

Be it known that I, THOMAS G. EDWARDS, a citizen of the United States, residing at Arlington, in the county of Carlisle and State of Kentucky, have invented a new and useful Trap, of which the following is a specification.

The device forming the subject matter of this application is a mouse trap. The invention aims to provide novel means for operating and controlling the jaw and to improve the construction of the trigger, the latch and attendant parts.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
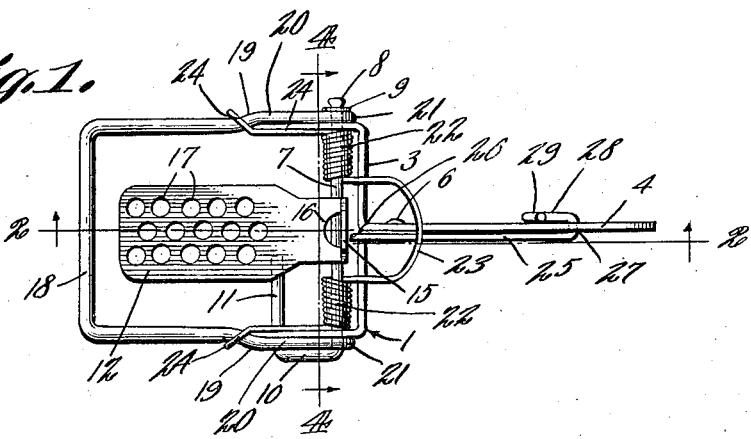
Figure 2:
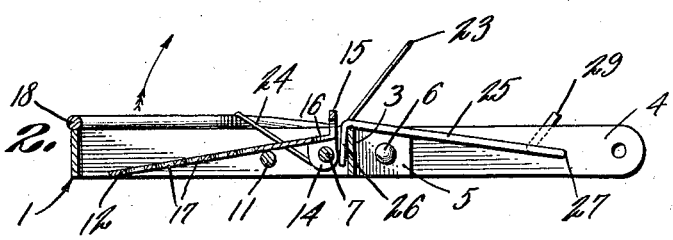
Figure 3:
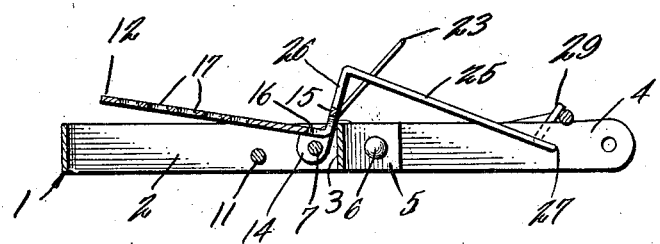

Figure 1 shows in top plan, a trap constructed in accordance with the invention, the trap being sprung; Figure 2 is a section on the line 2—2 of Figure 1, the trap being sprung; Figure 3 is a section on the line 2—2 of Figure 1, the trap being set; Figure 4 is a cross section on the line 4—4; Figure 5 is a top plan showing the frame; and Figure 6 is a top plan showing a modified form of frame.

In carrying out the invention, there is provided a frame 1, including, as shown in Figure 5 a loop-shaped head 2 including an end member 3 having extensions 4 and 5, the extension 4 being longer than the extension 5, the extensions being connected by a securing element 6.

A support in the form of a rod 7 extends transversely of the frame 1, and through the side portions of the frame, the rod being supplied at one end with a head 8 and a washer 9. At its opposite end, the rod 7 is provided with an arm 10, extended parallel to the adjacent side portion of the head 2, the arm terminating in a finger 11, extended through the side portion of the head 2, within the contour of the head.

The numeral 12 designates a trigger, in the form of a plate, located within the head 2 and provided with depending ears 14, through which the rod 7 passes, the trigger thus being mounted pivotally on the rod. At its inner end, the trigger 12 is supplied with an upstanding lip 15, there being an opening 16 in the trigger 12 at the point of juncture between the lip 15 and the body portion of the trigger. The trigger 12 preferably is perforated as shown at 17.

The trap includes a loop-shaped jaw 18, located directly above the outer end of the head 2 in alinement wherewith, the jaw being offset as indicated at 19 so that its ends 20 lie outwardly of the side portions of the frame 1, the ends of the jaw terminating in eyes 21, receiving the rod 7, the jaw thus being mounted pivotally on the rod. One of the eyes 21 is disposed between the washer 9 and the adjacent side portion of the frame 1. The other of the eyes 21 is disposed between the arm 10 and that portion of the frame which is adjacent thereto.

Torsion springs 22 surround the rod 7 and are located within the head 2, the inner ends of the springs being connected by an upstanding U-shaped yoke 23. The springs 22 are equipped at their outer ends with forwardly presented arms 24 engaged about the side portions of the jaw 18.

A latch 25 extends longitudinally of the extension member 4 and is provided at its forward extremity with a depending end 26, the rear end of the latch being mounted pivotally, as indicated at 27, in the extension 5. The said end of the latch 25 merges into an arm 28, extended toward the head 2, the arm 28 having an upstanding keeper 29.

The frame need not be fashioned precisely as hereinbefore described and as shown in Figure 5. Thus, referring to Figure 6, the frame is denoted generally by the numeral 30 and includes an end member 31 having an extension 32, the frame including an end member 33 overlapped on the end member 31 and attached thereto by securing elements 34.

In practical operation, referring to Figure 2, the jaw 18 is swung in the direction of the arrow until the jaw is engaged with the keeper 29, the end 26 of the latch 25 resting on the lip 15 of the trigger 12, the trap, then, being disposed as shown in Figure 3. Referring to Figure 3, if the trigger 12 is pressed downwardly, the lip 15 of the trigger is disengaged from the end 26 of the latch 25, the jaw 18 is released, and the springs 22 swing the jaw into gripping position with respect to the animal, the latch 25 dropping downwardly into the position shown in Figure 2, and resting on the end member 3 of the frame 1. If the trigger 12 be swung upwardly from the position shown in Figure 3, the trap will likewise be sprung, the depending end 26 of the latch 25 being received in the opening 16 of the trigger 12.

The finger 11 constitutes a stop or rest for the trigger 12, when the trap is in the position delineated in Figure 2. The yoke 23 which connects the springs 22 extends above the latch 25, and the latch 25 can be lifted to a limited extent only. Since the latch 25 can be lifted to a limited extent only, the latch, always is approximately in a working position, and a person unacquainted with the working of the trap cannot dispose the latch in such a position that the trap cannot be set readily. No confusion results as to the method of setting the trap, even though the operator may not be skilled in its use.

Owing to the fact that the jaw 18 is located, throughout the major portion of its extent, directly above the frame 1, the animal is caught directly between the jaw and the frame and is held securely. The bait may simply be placed within the contour of the head 2, beneath the trigger 12, the perforations 17 in the trigger rendering the bait visible. The trap operates without noise, is strong in construction, and is so constituted that it can be cleaned readily, thereby avoiding the retaining of a scent.

What is claimed is:—

A trap comprising a frame; a support carried by the frame; a jaw mounted pivotally on the support; a trigger mounted pivotally on the support; a latch mounted pivotaly on the frame and cooperating with the trigger and with the jaw to hold the jaw set; and springs carried by the support and cooperating with the jaw to close the jaw, the springs being connected by an inverted U-shaped yoke within which the latch operates, the yoke constituting a stop for the latch when the latch moves away from the trigger.

In testimony that I claim the foregoing as my own, I have hereto affixed my signature in the presence of two witnesses.

THOMAS G. EDWARDS.

Witnesses:
 E. D. HOLT,
 C. F. SULLENGER.